US008251313B2

(12) United States Patent
Goto

(10) Patent No.: US 8,251,313 B2
(45) Date of Patent: Aug. 28, 2012

(54) ICE PROTECTION SYSTEM FOR AIRCRAFT

(75) Inventor: Kenichi Goto, Greensboro, NC (US)

(73) Assignee: Honda Patents & Technologies North America, LLC, Torrence, CA (US)

( * ) Notice: Subject to any disclaimer, the term of this patent is extended or adjusted under 35 U.S.C. 154(b) by 1316 days.

(21) Appl. No.: 11/256,429

(22) Filed: Oct. 21, 2005

(65) Prior Publication Data
US 2007/0102573 A1 May 10, 2007

(51) Int. Cl.
B64D 15/00 (2006.01)
(52) U.S. Cl. ............ 244/134 R; 244/134 A; 244/134 B; 244/134 D
(58) Field of Classification Search ............... 244/134 R, 244/134 A, 135 D, 134 B
See application file for complete search history.

(56) References Cited

U.S. PATENT DOCUMENTS

| | | | | |
|---|---|---|---|---|
| 2,142,785 A | * | 1/1939 | Hanson | 219/618 |
| 2,237,175 A | * | 4/1941 | Colley | 244/134 A |
| 4,732,351 A | * | 3/1988 | Bird | 244/134 D |
| 5,337,978 A | * | 8/1994 | Fahrner et al. | 244/134 A |
| 5,427,332 A | * | 6/1995 | Rauckhorst et al. | 244/134 A |
| 5,489,073 A | * | 2/1996 | Leffel et al. | 244/134 R |
| 5,547,150 A | * | 8/1996 | Adams et al. | 244/134 R |
| 5,584,450 A | * | 12/1996 | Pisarski | 244/134 D |
| 5,615,849 A | * | 4/1997 | Salisbury | 244/134 R |
| 5,657,951 A | | 8/1997 | Giamati | |
| 5,657,952 A | | 8/1997 | Goldberg | |
| 5,845,878 A | * | 12/1998 | Rauckhorst et al. | 244/134 A |
| 5,934,617 A | | 8/1999 | Rutherford | |
| 6,129,314 A | * | 10/2000 | Giamati et al. | 244/134 R |
| 6,194,685 B1 | * | 2/2001 | Rutherford | 219/201 |
| 6,196,500 B1 | | 3/2001 | Al-Khalil et al. | |
| 6,237,874 B1 | | 5/2001 | Rutherford et al. | |
| 6,253,126 B1 | * | 6/2001 | Palmer | 701/14 |
| 6,264,142 B1 | * | 7/2001 | Voss et al. | 244/136 |
| 6,279,856 B1 | | 8/2001 | Rutherford et al. | |
| 6,283,411 B1 | * | 9/2001 | Giamati et al. | 244/134 A |
| 6,330,986 B1 | | 12/2001 | Rutherford et al. | |
| 6,443,394 B1 | * | 9/2002 | Weisend, Jr. | 244/134 A |
| RE38,024 E | * | 3/2003 | Adams et al. | 244/134 D |
| 7,157,663 B1 | * | 1/2007 | Kismarton | 219/201 |
| 7,278,610 B2 | * | 10/2007 | Giamati | 244/134 D |
| 2007/0257153 A1 | * | 11/2007 | Froman et al. | 244/134 D |

OTHER PUBLICATIONS

"Boeing 747-400 Family" Boeing, Aug. 2000, 1 page http://web.archive.org/web/20000816092549/http://www.boeing.com/commercial/747family/.*

* cited by examiner

Primary Examiner — Joseph W Sanderson
(74) Attorney, Agent, or Firm — Rankin, Hill & Clark LLP

(57) ABSTRACT

The ice prevention system of the present invention utilizes, in combination, a de-ice subsystem and anti-ice subsystem in a new configuration on an aircraft with engines located behind its wings. Depending on the vertical location of the engines with respect to the wings, the anti-ice subsystem is configured on an upper or lower portion of a leading edge of the wings. If the engine is located above the wing, the anti-ice system is configured only on a section of the wing aligned with the engine and only on the upper portion of the leading edge. If the engine is located below the wing, the placement of anti-ice system is reversed. The de-ice subsystem is configured on the opposite portion of the leading edge adjacent to the anti-ice subsystem and on the remainder of the leading edge of the wing.

17 Claims, 4 Drawing Sheets

ICE PROTECTION SYSTEM FOR AIRCRAFT

BACKGROUND OF THE INVENTION

The formation of ice on aircraft wings can be a severe problem. Ice tends to form from condensation on the leading edge of the wing. The presence of ice changes the geometry of the wing, reduces the lift forces generated by the wing and increases drag. Additionally, ice increases the weight of the wing, thus, compromising the wing's structural integrity.

Two types of ice protection systems, a de-ice system and anti-ice system, are used to reduce the accumulation of ice on aircraft wings. A de-ice system allows solid ice to form on the wing, but removes the ice before it accumulates to a dangerous shape or amount. The accumulating ice is peeled from the wing by the de-ice system and is blown off the wing by passing air. An anti-ice system does not allow solid ice to even form on the wing, thus, only condensate water is formed on the wing and the water is also blown off by the passing air.

Anti-ice systems usually consume large amounts of aircraft power. A typical anti-ice system is an electric heater including a generator of electric power and a series of resistance elements built into the wing structure. This system consumes considerable electric power. A hot bleed air anti-ice system is also used widely. The hot bleed air extracted from the aircraft engine is discharged into the wing structure in order to maintain the temperature of the wing surface above the freezing point and thereby prevent ice from forming. This bleed air anti-ice system does not require electrical power, but extracting bleed air from the engine causes power loss affecting the engine thrust. In either case, a significant amount of power is required for anti-ice systems as compared to de-ice systems. As a result, to maximize aircraft power efficiency, the use of anti-ice systems must be minimized.

Various types of de-ice systems are known. A typical system is a bleed air boot system utilizing bleed air to inflate rubber boots installed on the wing's leading edge. Bleed air is required just to inflate the boots and to remove the ice, so the required amount of air is much less than the hot air anti-ice systems. This device causes less power loss than the hot bleed air anti-ice system. One alternative de-ice system is an electromagnetic expulsion de-ice system. This system removes ice by the impact of electric coils installed in the wing structure. This system requires much less electric power than the electric heater anti-ice system. In either system described above, de-ice systems require much less power than anti-ice systems.

Aircraft wings have been designed that use a combination of de-ice and anti-ice systems in order to minimize the amount of power taken from other systems within the aircraft. Typically, the anti-ice system is configured at an inboard area, adjacent to the fuselage, wrapping around the leading edge of the wing. This prevents ice chunks forming on the wing that could detach and contact and/or enter the aircraft engine and cause destructive results. The remainder (outboard area) of the leading edge of the wing is configured with a de-ice system, wrapping around the leading edge of the wing. However, this combination system design still utilizes a great deal of energy. What is desired is an even more efficient system that prevents the damaging effects of aircraft wing ice.

BRIEF SUMMARY OF THE INVENTION

The present invention overcomes these and other disadvantages in the prior art. The ice prevention system of the present invention utilizes, in combination, a de-ice subsystem and an anti-ice subsystem in a new configuration that is correlated to engine position relative to the associated wing. More specifically, depending on the vertical location of the aircraft's engines with respect to the wing, the anti-ice subsystem is configured on an upper or lower portion of the wing's leading edge. If the engine is located above the wing, the anti-ice system is configured only on the upper portion of the leading edge on a section of the wing in alignment with the engine. If the engine is located below the wing, the anti-ice system is configured only on the lower portion of the leading edge on a section of the wing in alignment with the engine. The de-ice subsystem is configured on the opposite portion of the leading edge adjacent to the anti-ice subsystem and on the remainder of the leading edge of the wing.

These and other features, aspect and advantages of the present invention will be fully described by the following description, appended claims, and accompanying drawings.

DETAILED DESCRIPTION OF THE INVENTION

Figure 1A:
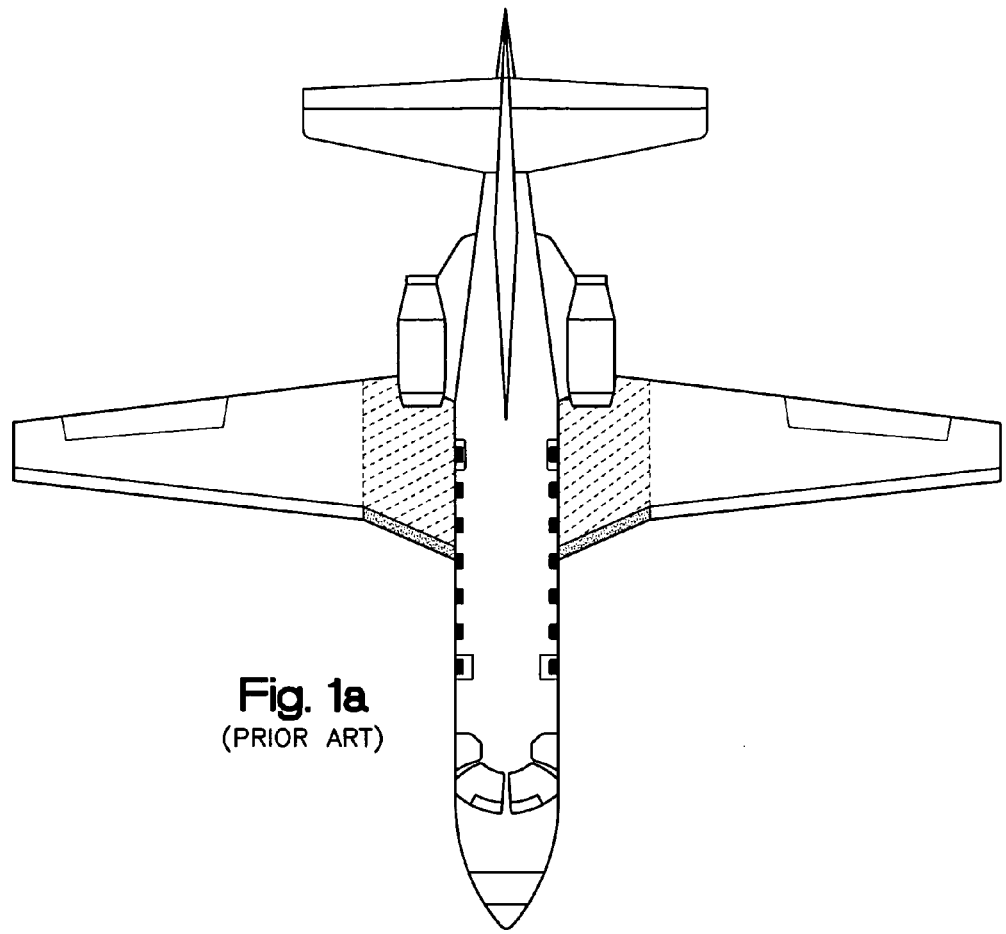
FIG. 1a is a top view of an aircraft employing an ice protection system of the prior art.
Figure 1B:
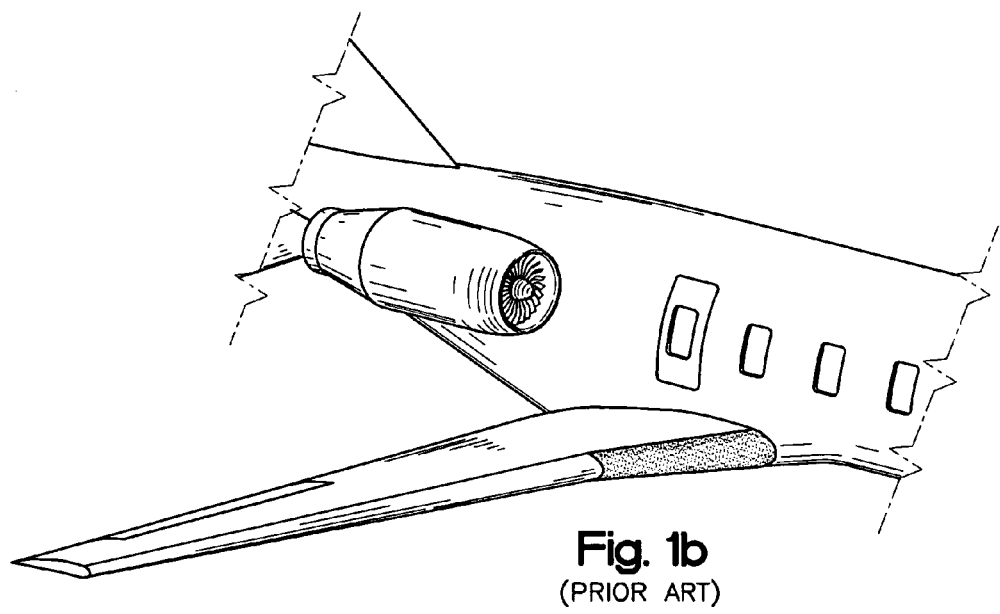
FIG. 1b is a perspective view of an aircraft section including a wing employing an ice protection system of the prior art.
Figure 2:
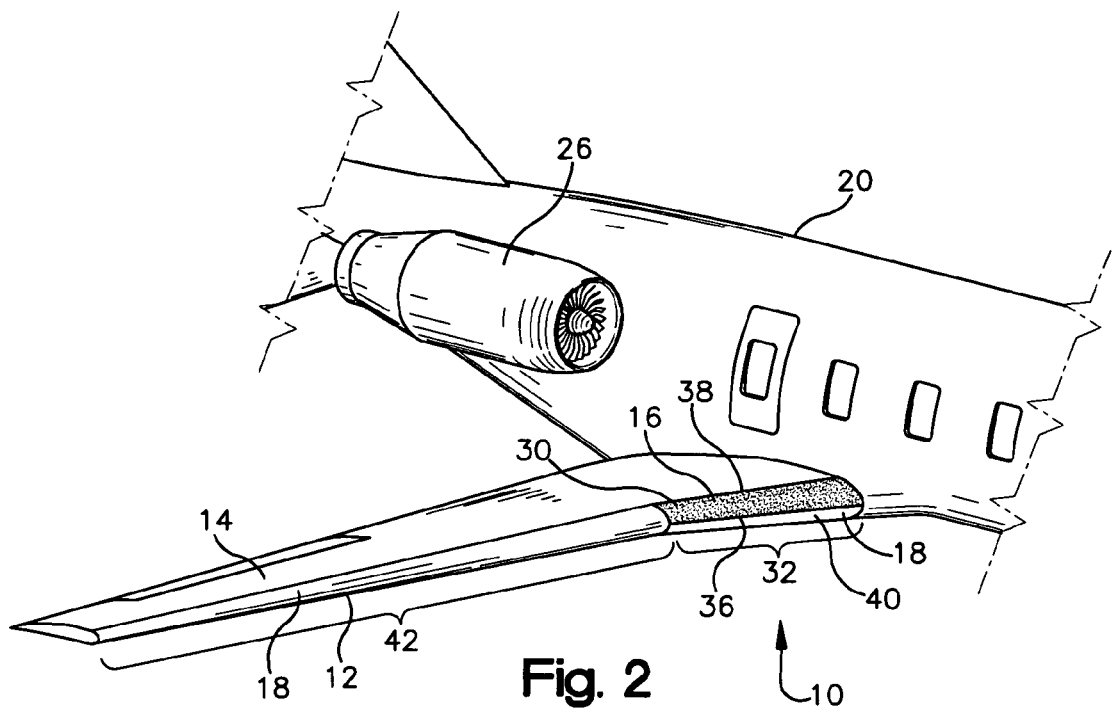
FIG. 2 is a perspective view of an aircraft section including a wing employing the ice protection system of the present invention.
Figure 4:
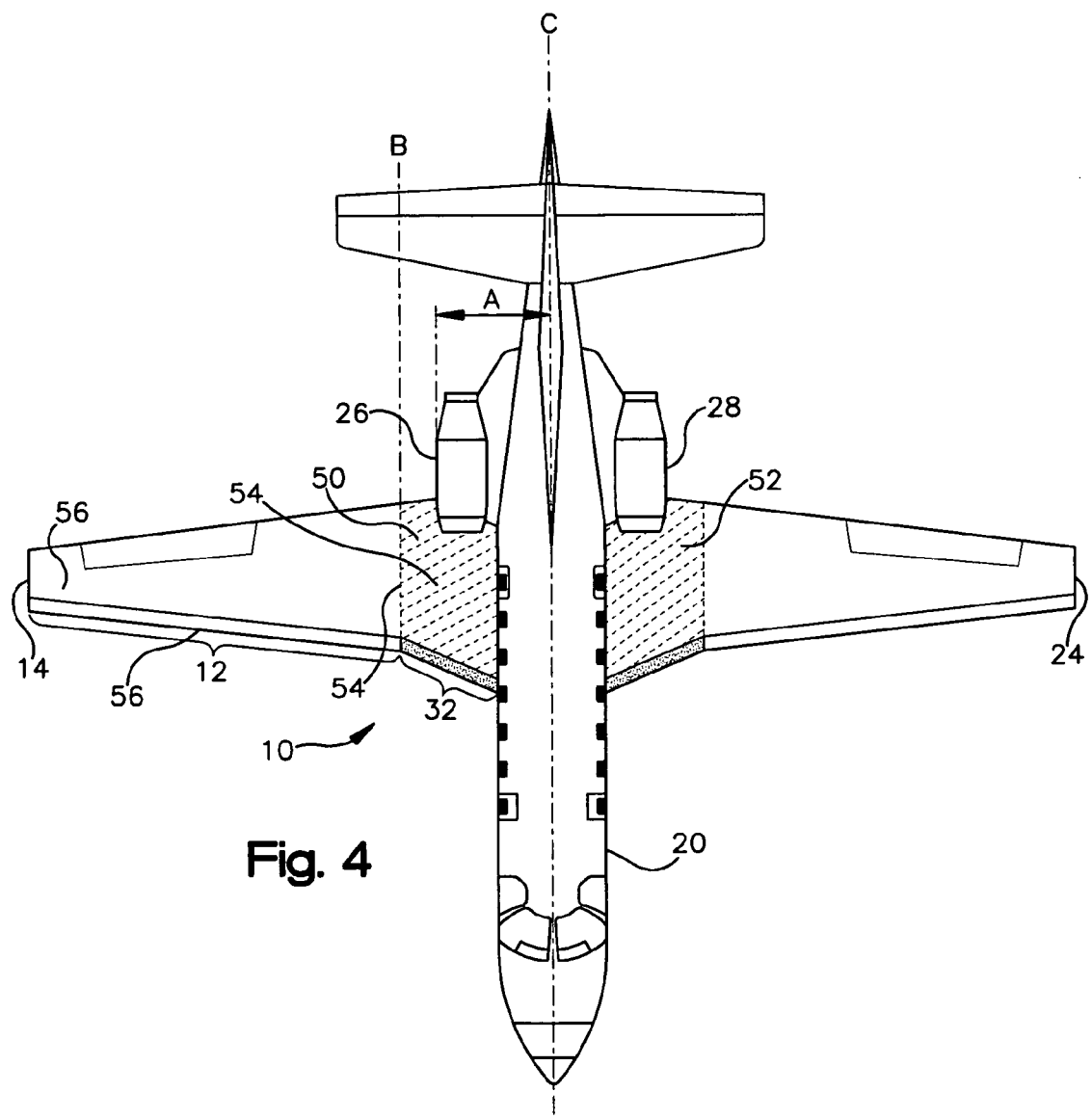
FIG. 4 is a top view of an aircraft employing an ice protection system of FIG. 2.

Referring to the drawings, specifically FIGS. 2 and 4, a preferred ice protection system 10 according to the present invention is illustrated. The ice protection system 10 is employed on the leading edge 12 of an aircraft wing 14 and includes an anti-ice subsystem 16 and a de-ice subsystem 18 configured in a manner to minimize energy consumption while preventing the hazard of ice chunks contacting the aircraft's engines.

As used within the specification and claims, the term "leading edge" refers to the forward portion of an aircraft wing upon which ice typically forms absent the presence of an anti-ice or de-ice system and such formation is critically detrimental to the aerodynamic function of the wing.

Referring to FIG. 4, the aircraft of the present invention includes a fuselage 20 that defines a longitudinal center axis "C" and first and second transverse wings 14 and 24 that extend outwardly from the fuselage 20. The aircraft also includes first and second engines 26 and 28 located on opposite sides of the fuselage 20 and rearward of the wings 14 and 24.

Referring to FIG. 2, the anti-ice subsystem 16 is shown formed on the upper portion 30 of the leading edge 12 of the wing 14. The anti-ice subsystem 16 functions through the use of transferred hot air or electrical resistance heat or any other method known in the art. The anti-ice subsystem 16 prevents ice from forming on the wing surface upon which the subsystem 16 is located. As a result, no chunks of ice can be blown into the aircraft engine 26. The anti-ice subsystem 16 is provided only on a first lateral section 32 of the wing 14. Referring to FIG. 4, preferably, the first section 32 including the anti-ice subsystem 16 extends from directly adjacent to the fuselage 20 laterally outward to a position "B" beyond the furthest distance "A" the aircraft engine 26 is offset from the fuselage 20. The position "B" is experimentally determined as a position where peeled ice particles from the wing will not enter the engine inlet under flight conditions.

Referring back to FIG. 2, the anti-ice subsystem 16 preferably stretches rearwardly and upwardly approximately from a location defined by an inflection point or transition between upper and lower surfaces of the wing, illustrated by line to a location, illustrated by line 38, where it has been experimentally determined that ice accumulation downstream of this line is not critical to aerodynamic performance. Unlike prior art systems where the anti-ice subsystem wraps around the entire (i.e. upper and lower wing surfaces) of the leading edge of the wing, the anti-ice subsystem 16 of the present invention extends over around approximately one half (upper half illustrated) of the leading edge 12. As a result, the anti-ice subsystem 16 of the present invention consumes significantly less energy than the prior art systems.

Preferably, the de-ice subsystem 18 covers the remaining positions of the leading edge 12 of the wing 14. First, the de-ice subsystem 18 covers the remainder of the first section's leading edge 40 below the anti-ice subsystem 16. Thus, in the illustrated embodiment, the de-ice subsystem 18 extends downwardly and rearwardly from the line 36 so as to extend over a lower portion of the leading edge 40 of the first section 32. Second, the de-ice subsystem 18 covers a second section 42 of the wing 14 along the leading edge 12. The second section 42 preferably is the remainder of the wing 14 not included in the first section 32. Thus, the de-ice subsystem 18 additionally extends from the end of the anti-ice subsystem 16 opposite the fuselage 20 to the distal end of the wing 14. The de-ice subsystem 18 is one of any type of de-ice systems known in the art, such as a boot system inflated by bleed air from the aircraft engine or an electromagnetic expulsion de-ice system. The de-ice subsystem 18 allows ice to form upon, but not adhere to, the wing 14. As ice forms on the wing 14 and is blown off, in the first section 32 of the wing aligned with the aircraft engine, the ice blows beneath the wing 14 and the associated engine 26, and as a result does not contact the aircraft engine 26. When ice forms on the second section 42 of the wing in the de-ice subsystem and detaches from the wing, the ice is too far out from the aircraft fuselage 20 to contact the aircraft engine 26. FIG. 4 shows ice-free zones 50 and 52 created behind the anti-ice subsystem 16. The aircraft engines 26 and 28 are included within the zones 50 and 52.

Much of the ice prevention system 10 has been described with reference to a single wing 14. However, the description is also appropriate for the second wing 24.

Figure 3:
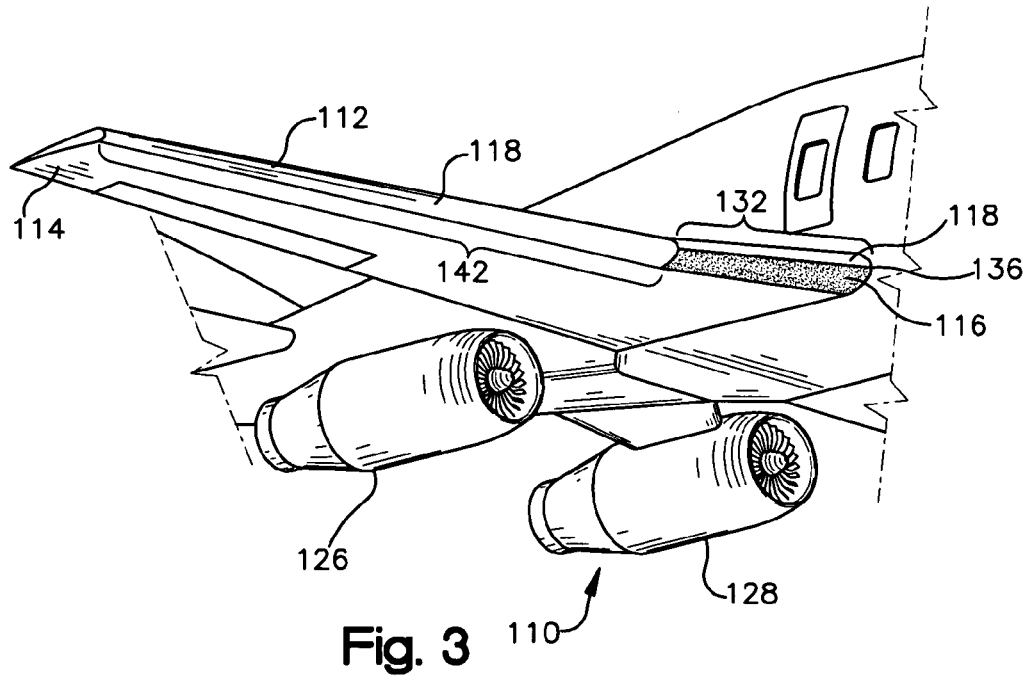
FIG. 3 is a perspective view of an aircraft section employing an alternate embodiment of the ice protection system of the present invention.

Referring to FIG. 3, in an alternate embodiment of the ice protection system 110, the aircraft's engines 126 and 128 are located below the level of the wing 114. As a result, in the first section 132, where the leading edge 112 of the wing 114 is aligned with the aircraft engine 126, the positions of the anti-ice subsystem 116 and de-ice subsystem 118 are reversed as compared to the previously described first embodiment. The anti-ice system 116 extends downwardly and rearwardly from a line 136, defined by an inflection point or transition between upper and lower surfaces of the wing generally along the forwardmost position of the leading edge 112 to the bottom of the leading edge 112. The de-ice subsystem 118 extends from the line 136 to the top of the leading edge 112.

As a result ice formed on the de-ice subsystem 118, when released from the wing 114, passes over the wing 114 and over the aircraft engine 126. Again no ice forms on the anti-ice subsystem 116.

Figure 5:
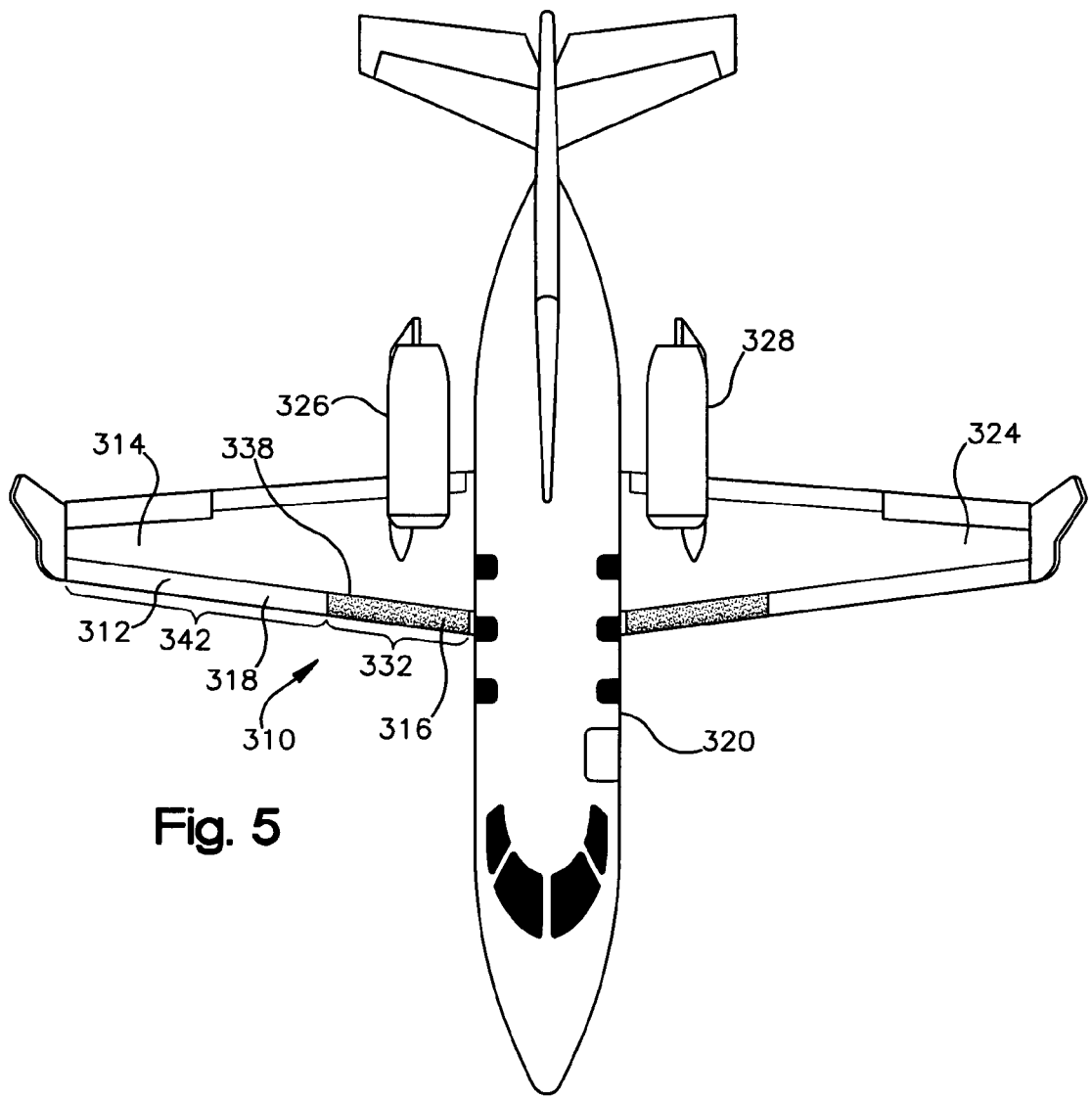
FIG. 5 is a top view of an alternate type of aircraft employing an ice protection system of the present invention.
Figure 6:
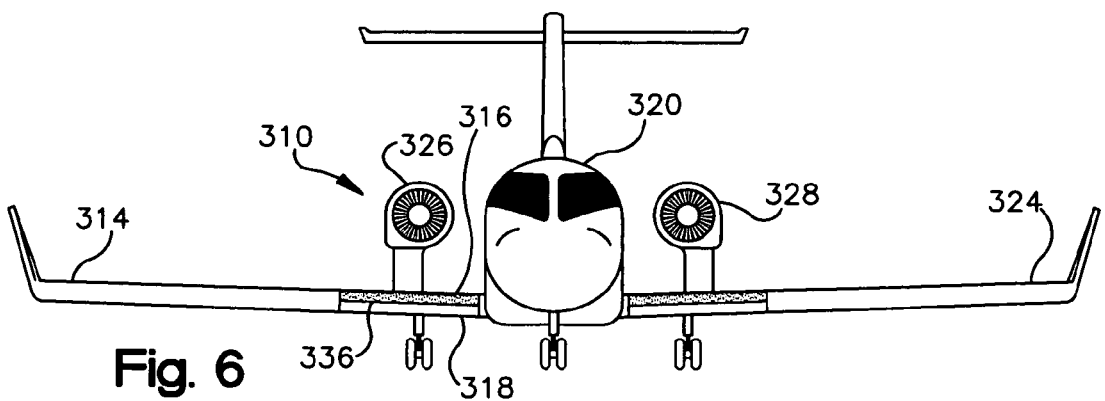
FIG. 6 is a front view of the aircraft of FIG. 5.

In FIGS. 2-4, the invention is shown being used on an aircraft wherein the first engine 26, 126 and second engine 28, 128 are secured to and offset from the aircraft fuselage 320. Referring to FIGS. 5 and 6, the ice protection system 310 is also used on aircraft wherein the engines 326, 328 are secured to the wings 314, 324 in a position offset from the aircraft fuselage 320.

The anti-ice subsystem 316, in a first section 332 of the wing 314, preferably stretches rearwardly and upwardly approximately from a location defined by an inflection point or transition between upper and lower surfaces of the wing, illustrated by line 336 to a location, illustrated by line 338, where it has been experimentally determined that ice accumulation downstream of this line is not critical to aerodynamic performance. Preferably, the de-ice subsystem 318 covers the remaining positions of the leading edge 312 of the wing 314. First, the de-ice subsystem 318 covers the remainder of the first section's leading edge below the anti-ice subsystem 316. Second, the de-ice subsystem 318 covers a second section 342 of the wing 314 along the leading edge 312. The second section 342 preferably is the remainder of the wing 314 not included in the first section 332.

In an aircraft with engines attached to the wings, the engine intake is typically closer to the wing's leading edge than in an aircraft wherein the engines are affixed to the fuselage. Although the engines 326, 328 are shown secured to the upper surfaces of the wings, the engines may alternatively be secured to the lower surfaces of the wings.

In either embodiment previously discussed, changes in the distance between the engines and the leading edge of the wing change the size of the anti-ice system. For example, as an engine is moved closer to the wing's leading edge, the position "B", that is experimentally determined, moves closer to the fuselage. Also, as an engine mounted above the wing is moved upward relative to the wing, the position of line 36, 136, 336, also experimentally determined, moves upward on the leading edge of the wing.

The present invention significantly reduces the amount of power within an aircraft that must be dedicated to ice protection on the wings. As a result more power is present for other aircraft systems or alternatively, less fuel can be used to operate the aircraft.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. An aircraft, comprising:

a fuselage defining a longitudinal center axis of the aircraft;

first and second wings extending from opposite sides of the fuselage, each wing defining a leading edge, said each wing further defining first and second sections along a length thereof;

a first engine offset from the center axis on a first side of the fuselage and generally rearward of the first wing leading edge, said first engine being disposed on a first vertical side of the first wing;

a second engine offset from the center axis on a second, opposite side of the fuselage and generally rearward of the second wing leading edge, said second engine being disposed on the first vertical side of the second wing;

an anti-ice subsystem configured solely along a first portion of the leading edge of the first section of each wing, wherein the first sections are aligned with the first and second engines on the first and second wings, and wherein the first portion is only on the first vertical side of the first and second wings; and a subsystem, capable of performing a de-icing function only, configured on the first section of each wing solely along a second portion, opposite the anti-ice subsystem, said second portion being on a second vertical side of the first and second wings;

wherein the anti-ice subsystem prevents ice from forming on, and subsequently detaching from, the wing at a location where said detached ice can contact the first and second engines and the de-ice subsystem allows ice to form on, and be subsequently detached from the wing at a location where detaching ice passes around the first and second engines.

2. The aircraft of claim 1, wherein the de-ice subsystem is disposed along the second vertical side of the leading edge of the entire first section of each wing.

3. The aircraft of claim 1, wherein the second section is located farther from the fuselage than the first section and wherein only a de-ice subsystem is additionally configured along the leading edge of the second section of each wing.

4. The aircraft of claim 3, wherein the leading edge of the first section is configured at a first angle with respect to the center axis of the fuselage and the second section is configured at a second, different angle with respect to the center axis of the fuselage.

5. The aircraft of claim 1, wherein the first section of each wing is directly adjacent to the aircraft fuselage.

6. The aircraft of claim 5, wherein the second section extends from a distal end of the first section to an end of the wing.

7. The aircraft of claim 1, wherein the first and second engines are secured to the fuselage.

8. The aircraft of claim 1, wherein the first engine is secured to the first wing and the second engine is secured to the second wing.

9. The aircraft of claim 1, wherein the anti-ice subsystem is an electric heater type.

10. The aircraft of claim 1, wherein the anti-ice subsystem is a hot bleed type.

11. The aircraft of claim 1, wherein the de-ice subsystem is an inflatable bladder type.

12. An aircraft, comprising:
a fuselage defining a longitudinal center axis of the aircraft;
first and second wings extending from opposite sides of the fuselage, each wing defining a leading edge, said each wing further defining first and second sections along a length thereof;
a first engine offset from the center axis on a first side of the fuselage and generally rearward of the first wing leading edge, said first engine being disposed on a first vertical side of the first wing;
a second engine offset from the center axis on a second, opposite side of the fuselage and generally rearward of the second wing leading edge, said second engine being disposed on the first vertical side of the second wing;
an anti-ice subsystem configured solely along a first portion of the leading edge of the first section of each wing, wherein the first sections are aligned with the first and second engines on the first and second wings, and wherein the first portion is only on the first vertical side of the first and second wings; and
a subsystem, capable of performing a de-icing function only, configured along a second portion, opposite the anti-ice subsystem, of the leading edge of the first section of each wing, said second portion being on a second vertical side of the first and second wings;
wherein a second section is located farther along the length of the wing from the fuselage than the first section and wherein only a de-ice subsystem is additionally configured along the leading edge of the second section of each wing; and
wherein the anti-ice subsystem prevents ice from forming on the portion of the leading edge of each aircraft wing that is on a side of the wing that is adjacent to the position of an aircraft engine.

13. The ice protection system of claim 12, wherein the one vertical side of the leading edge of the aircraft wing is an upper side.

14. The aircraft of claim 12, wherein the first section of each wing is directly adjacent to the aircraft fuselage.

15. The aircraft of claim 12, wherein the second section extends from a distal end of the first section to an end of the wing.

16. The aircraft of claim 12, wherein the leading edge of the first section is configured at a first angle with respect to the center axis of the fuselage and the second section is configured at a second, different angle with respect to the center axis of the fuselage.

17. The aircraft of claim 12, wherein the anti-ice subsystem is an electric heater type.

* * * * *